United States Patent [19]

Csillag et al.

[11] Patent Number: 4,907,377
[45] Date of Patent: Mar. 13, 1990

[54] DIRECTIONAL CATALYST ALLOY SWEEP THROUGH PROCESS FOR PREPARING DIAMOND COMPACTS

[75] Inventors: Frank J. Csillag, Westerville; Harold P. Bovenkerk, Worthington, both of Ohio

[73] Assignee: General Electric Company, Worthington, Ohio

[21] Appl. No.: 207,685

[22] Filed: Jun. 16, 1988

[51] Int. Cl.⁴ .............................................. D24D 3/04
[52] U.S. Cl. ....................................... 51/309; 51/307; 76/107 A; 264/60
[58] Field of Search .................... 51/307, 309; 264/60; 76/107 A

[56] References Cited

U.S. PATENT DOCUMENTS

| | | | |
|---|---|---|---|
| 3,745,623 | 7/1973 | Wentorf, Jr. | 29/95 B |
| 3,831,428 | 8/1974 | Wentorf, Jr. | 72/467 |
| 3,913,280 | 10/1975 | Hall | 51/307 |
| 4,108,614 | 8/1978 | Mitchell | 51/295 |
| 4,129,052 | 12/1978 | Bieberich | 76/107 A |
| 4,144,739 | 3/1979 | Corbin | 72/467 |
| 4,171,973 | 10/1979 | Hara | 75/237 |
| 4,219,339 | 8/1980 | Wilson | 51/307 |
| 4,229,186 | 10/1980 | Wilson | 51/297 |
| 4,231,762 | 11/1980 | Hara | 51/309 |
| 4,255,165 | 3/1981 | Dennis et al. | 51/309 |
| 4,268,276 | 5/1981 | Bovenkerk | 51/295 |
| 4,370,149 | 1/1983 | Harra | 51/309 |
| 4,525,179 | 6/1985 | Gigl | 51/309 |
| 4,534,934 | 8/1985 | Cho | 51/309 |

FOREIGN PATENT DOCUMENTS 756730 4/1977 South Africa .
817930 2/1983 South Africa .

OTHER PUBLICATIONS

On the Properties of Fine Grain Sintered Diamond Bodies, Hara et al., Proceedings of the 10th Plansee—Seminar, Metal Work Reutte, Austria, vol. 2, pp. 581–589.

Primary Examiner—James Derrington
Attorney, Agent, or Firm—Gary L. Loser

[57] ABSTRACT

Disclosed is an improved method for making a polycrystalline diamond compact comprising subjecting a mass of diamond particles, which mass is adjacent a cemented metal carbide mass containing a catalyst, to a high pressure/high temperature process which results in a compact characterized by diamond-to-diamond bonding. The improvement in such process comprises placing a second catalyst source adjacent the diamond mass, said second catalyst having a melting point which is lower than the melting point of the catalyst of the carbide; and subjecting said mass to high pressure/high temperature sintering at a temperature above the melting point of the second catalyst, but below the melting point of the carbide catalyst, for causing said second catalyst to selectively diffuse through said mass for forming said polycrystalline diamond compact. The preferred catalyst is a mixture of cobalt and boron.

10 Claims, 2 Drawing Sheets

DIRECTIONAL CATALYST ALLOY SWEEP THROUGH PROCESS FOR PREPARING DIAMOND COMPACTS

This application is a division of application Ser. No. 06/697,669, filed 2/4/85 now U.S. Pat. No. 4,778,486.

BACKGROUND OF THE INVENTION

The present invention relates to methods of preparing polycrystalline diamond compacts made by a high pressure-high temperature process (HP/HT) and has special application in the preparation of polycrystalline diamond compacts for use in wire dies.

A polycrystalline diamond compact comprises a mass of diamond-to-diamond bonded particles in which the diamond concentration is at least 70 volume percent. Representative wire drawing dies made with polycrystalline diamond compacts can be found, for example, in U.S. Pat. Nos. 3,831,428, 4,129,052, 4,144,739, 4,171,973, and 4,231,762. Such wire die compacts comprise an inner mass of polycrystalline diamond which inner mass is surrounded by and bonded to a mass of cemented metal carbide, such as cobalt cemented tungsten carbide. These are referred to as carbide-supported wire die compacts. Unsupported polycrystalline diamond wire die compacts without a surrounding mass of cemented metal carbide also are available. Carbide-supported polycrystalline diamond compacts in other configurations are described, for example, in U.S. Pat. Nos. 3,745,623, 4,108,614, 4,215,999, 4,219,339, 4,229,186, and 4,255,165.

The formation of diamond-to-diamond bonds between individual abrasive grains requires a catalyst/solvent (hereinafter referred to as a catalyst) that is able to wet the diamond surface as well as dissolve and precipitate diamond. This task normally is complicated by the presence of inhibiting impurities. The impurities can be in the form of surface-adsorbed species including oxygen and water, for example. The impurities can block pore passages between the grains and alter the diamond surfaces so that catalyst penetration becomes inadequate and surfaces are no longer wetted. The problems caused by impurities are magnified as the abrasive grain size decreases. Thus, decreasing pore size and increasing surface area to volume ratios are contributing factors that lead to a higher frequency of poorly bonded diamond compacts as smaller grains are used. However, the ease of finishing diamond compacts that have been sintered from fine grain diamond, e.g. less than about 10 microns, into a desired geometry make such compacts desirable in the marketplace. In the case of wire die compacts, the use of fine diamond grains enables an improvement in the surface finish of wires that have been drawn therethrough, making such compacts especially desirable. In addition to the noted affect of diamond particle size, it also has been observed that the incidence of flaws during fabrication generally tends to increase with overall compact size.

The high temperature/high pressure (HP/HT) process of sintering diamond into a coherent mass in making polycrystalline diamond compacts with a catalyst "sweep-through" technique as taught by U.S. Pat. Nos. 3,745,623 and 3,831,428 is well known in the art. An important feature of the sweep-through technique is that the amount of catalyst in the system is determined automatically by the available free volume within the mass of polycrystalline grains being sintered. The amount of catalyst is independent of diamond size, diamond size distribution, and the change in free volume during compression and sintering. Diamond bonding during the process is enhanced by the pushing of impurities from the diamond consolidation zone by the sweeping catalyst solvent front. In this regard, commonly assigned U.S. Pat. No. 4,525,179 discloses an improved sweep-through process which utilizes a pre-sweep of a relatively low melting point material, typified by copper, which preceeds a catalyst sweep through a diamond particle mass in the production of diamond compacts. Another recent commonly-assigned patent, U.S. Pat. No. 4,534,934 discloses an improved process in the manufacture of diamond wire die compacts in which catalyst sweeps both axially and radially into a diamond particle mass.

Another method suggested for decreasing the incidence of flaws, particularly in fine grain polycrystalline diamond compacts, is the addition of particles designed to inhibit excessive regrowth during sweep as proposed by Hara et al., "On the Properties of Fine Grain Sintered Diamond Bodies", *Proceedings of the 10th Plainsee-Seminar,* Hugo M. Ortner, Editor, Metal Work Plainsee, Reutte, Austria, Vol. 2, pp 581-589 (1981). Another technique proposed to improve the diamond compact portion of the wire drawing dies is the use of sintering aids as set forth in U.S. Pat. Nos. 3,913,280, 4,268,276, 4,370,149, and South African application No. 756730. Despite the many benefits which have been achieved in the art, the need exists for techniques which substantially enhance the reproduceability of well bonded polycrystalline diamond compacts, especially those sintered with fine grain diamond.

BROAD STATEMENT OF THE INVENTION

The present invention addresses the problems discussed above and provides a new selective, uniform controlled directional catalyst sweep-through process and an improved compact made therefrom. This process also enables a reduction in sintering temperatures and pressures needed for satisfactory results. The use of less severe operating conditions can lead to improvements in apparatus life with a corresponding decrease in manufacturing costs. The present invention is directed to a method for making a polycrystalline diamond compact comprising subjecting a mass of diamond particles to a high pressure/high temperature (HP/HT) process which results in a compact characterized by diamond-to-diamond bonding.

In this invention the mass of diamond particles is provided in an assembly adjacent a mass of cemented metal cabide which includes a catalyst for diamond recrystallization. A second catalyst source also is provided adjacent the diamond mass. The second catalyst source is selected such that the catalyst in the second source melts at a lower temperature than the catalyst in the carbide under high pressure, for example above 45 kbar. The assembly then is subjected to HP/HT sintering at a temperature above the melting point of the catalyst in the second source, but below the melting point of the catalyst in the carbide to enable a selective, controlled sweep of catalyst from the second source into the diamond mass.

In an exemplary embodiment of this invention, a mass of diamond particles is contained within and surrounded by a cobalt-cemented tungsten carbide annulus. Depending on the composition of the carbide, the cobalt therein can become molten under high pressure conditions at a temperature below 1350° C. In such an embodiment, a second catalyst source is placed adjacent the diamond mass at an open end of the carbide annulus. The composition of the second catalyst source is selected such that the catalyst therein becomes molten below the temperature of the cobalt catalyst in the carbide annulus. While the catalyst source may be a lower-melting point catalyst, the source is preferably a mixture comprising a catalyst and a diffusion aid, which mixture exhibits a melting point below that of the catalyst itself. A preformed alloy may be used as can a physical mixture provided the mixture forms an alloy under HP/HT sintering conditions. The assembly then is subjected to such sintering conditions at a temperature below the melting point of the cobalt catalyst in the carbide, but above the melting point of the catalyst in the second catalyst source. In this manner, the catalyst from the second source selectively axially diffuses or sweeps through the diamond mass in a net direction to the opposite opening of the carbide annulus, i.e., controlled directional sweep-through or diffusion.

Desirably, the second catalyst source is selected such that the melting point of the catalyst therein is at least 50° C. less than the melting point of the catalyst in the cemented metal carbide, advantageously about 100° C. less, and preferably about 200° C. less. In this manner the process is more controllable and substantially no metal from the metal carbide will infiltrate or diffuse into the diamond mass during the sintering process. In addition, such a large difference in melting point allows the sintering process to proceed at a lower temperature than previously possible, resulting in lower cost and less stress on the apparatus used.

The preferred second catalyst source is a physical mixture or preformed alloy of cobalt or nickel and boron. The proportion of catalyst and boron are adjusted to obtain the desired melting point for achieving the selective directional catalyst diffusion. In addition, for acheiving uniformity and minimizing the undesirable effects of secondary flow paths on the resulting compact, longer sweep paths are provided, as detailed herein.

Advantages of the present invention include the ability to achieve a uniform and homogeneous sweep-through of catalyst through the mass of diamond particles for achieving improved diamond-to-diamond bonding. Another advantage is the ability to achieve consistency and reproduceability in polycrystalline diamond compact production. A further advantage is the ability to utilize fine diamond crytals, e.g. less than 10 microns, in forming the diamond compact. There also is an advantage in increased apparatus life resulting from the ability to operate at lower HP/HT conditions. These and other advantages will become readily apparent to those skilled in the art based upon the disclosure contained herein.

The drawings which are not to scale will be described in more detail in connection with the following Detailed Description of the Invention.

DETAILED DESCRIPTION OF THE INVENTION

Figure 1:
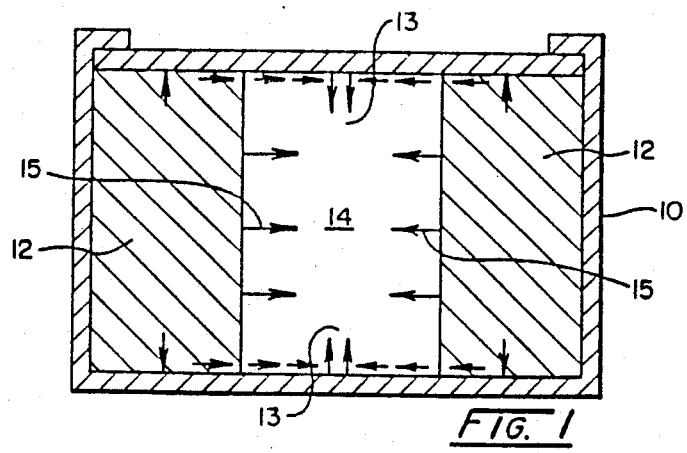
FIG. 1 is a cross-sectional view through a typical cemented carbide-supported polycrystalline diamond wire die assembly used in sintering the die and indicating possible paths of catalyst sweep in a conventional radial sweep-through process.

In conventional systems for sintering diamond in cemented carbide supported compacts, a major flaw of catalyst infiltrates the diamond mass from the carbide support. For example, in a wire die configuration as depicted in FIG. 1, flow 15 of catalyst for diamond recrystallization radially infiltrates core 14 of diamond particles from annular cemented metal carbide support 12. In a typical embodiment the annulus is formed of cobalt cemented tungsten carbide from which a portion of the cobalt flows during high pressure/high temperature (HP/HT) sintering conditions to act as the catalyst.

More specifically, FIG. 1 depicts a conventional assembly for making a polycrystalline diamond wire die compact under HP/HT conditions. Such assemblies and HP/HT conditions are well known in the art and are described, for example, in U.S. Pat. Nos. 3,745,623, 3,831,428, and 3,850,591. The assembly depicted comprises enclosure 10 of a refractory metal such as molybdenum, tantalum, titanium, tungsten, zirconium, etc., in which is contained cemented metal carbide annulus 12 and interiorly disposed central core of diamond particles 14. In addition to radial catalyst flow 15, a significant catalyst flow 13 across the ends of core 14 is thought to occur in such a configuration. In smaller wire dies, primary radial sweep 15 is thought to be sufficiently rapid that catalyst flow 13 across the end of the die blank is not as noticeable. However, in diamond dies of larger core construction or utilizing finer diamond particles, flow 13 of catalyst across the core end can become more significant. Such an alternative catalyst flow path can result in non-uniform infiltration of catalyst into diamond core 14, and may hamper the full densification of the core, thereby increasing the probability of flaw formation. Similarly, such a non-uniform flow hampers the concentration of impurities at a point in the diamond core from which they might be more easily removed. It also has been suggested that radial catalyst flow 15 may cause some cobalt depletion in carbide annulus 12 and that some portion of the metal from the metal carbide (for example, tungsten in a tungsten carbide annulus) will enter diamond core 14 along with radial flow 15 of cobalt.

Figure 2:
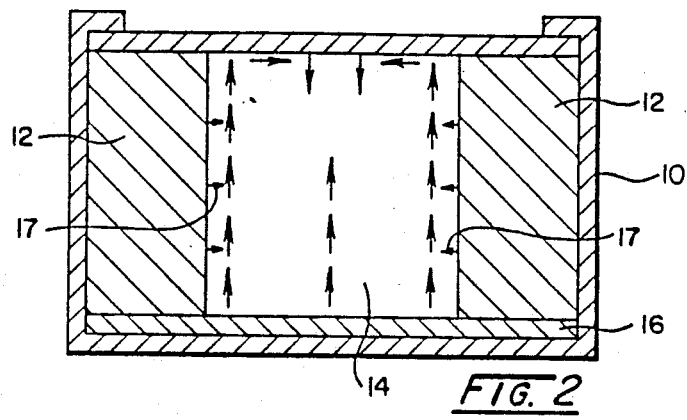
FIG. 2 is a cross-sectional view through a carbide-supported wire die assembly used in sintering the die which depicts possible paths of catalyst sweep in a controlled directional sweep-through process.

A controlled directional sweep-through process according to the invention, as depicted in FIG. 2, similarly employs metal enclosure 10 bearing cemented carbide annulus 12 and central diamond core 14. However, a particular second catalyst source 16 is disposed at one end of enclosure 10 adjacent an end of annulus 12 and diamond core 14.

As noted above, cemented carbide annuli typically are cemented with a metal which is a catalyst for diamond recrystallization, cobalt being the metal of choice predominant in the industry. The simple supply of a second catalyst source at 16 likely would result in a relatively random combination of radial and axial sweep-through, as can be envisioned by the combination of sweep paths shown in FIG. 1 and FIG. 2. The resulting infiltration process would be replete in control difficulties. The selective directional catalyst sweep of the present invention, as shown in FIG. 2, is achieved by utilizing a particular type of catalyst source at one end of core 14 in a form such that this second catalyst has a melting point less than the melting point of the catalyst in cemented carbide annulus 12. Known catalysts in this art may be selected from the group consisting of cobalt, iron, nickel, ruthenium, rhodium, osmium, iridium, palladium, platinum, chromium, manganese, tantalum, and mixtures and alloys thereof. Cobalt, iron, and nickel catalyst predominate in use with cobalt being the most preferred. Utilizing cobalt or nickel catalyst, a preferred second catalyst source 16, according to this invention, is obtained by alloying with boron. Of course, this second catalyst source may be in the form of a pre-formed alloy, or may be in the form of a mixture of powders sufficient to form an alloy under HP/HT conditions.

A number of technical reasons for preferring a metal/boron system exist and include: such alloy efficiently dissolves and precipitates diamond; boron has a high affinity towards carbon; boron is effective in lowreing the melting point of the catalyst; thermodynamically stable cobalt/boron carbides are formed; the composition remains homogeneous throughout the core when used with a cobalt-cemented carbide; boron is a diamond grain regrowth inhibitor; and the stable cobalt boron alloys formed are very hard phases. A table summarizing the effect of composition on melting point of cobalt-boron alloys, as taken from Elliott, "Constitution of Binary Alloys, First Supplement", McGraw-Hill Book Company, pp 115–116 (1958) is set forth below:

TABLE 1

| Weight Percent Boron in a Co—B Alloy | Melting Point °C. |
| --- | --- |
| 0 | 1495 |
| 1 | 1340 |
| 2 | 1220 |
| 3 | 1140 |
| 4 | 1095 |
| 5 | 1130 |
| 6 | 1190 |
| 7 | 1240 |
| 8 | 1250 |

As will be observed from Table 1, the composition with the lowest melting point in the cobalt-boron alloy system contains about 4 weight percent boron. However, a 4 weight percent pre-formed boron alloy is brittle and difficult to fabricate. Therefore, a 3 weight percent boron alloy which is more ductile is preferred. A sufficiently depressed melting point is experienced with such an alloy system. Between about 2% and 7% boron should prove useful in the process when a cobalt cemented tungsten carbide annular support is employed. The low melting point of a cobalt-boron alloy (3 weight percent boron) of about 1150° C. minimizes the opportunity for cobalt or other metal from the carbide support annulus to radially infiltrate the central diamond core provided that the sintering temperature is at least initially less (under high pressure conditions) than the melting point of cobalt in the carbide annulus and above the melting point of the named alloy for an amount of time sufficient to enable the alloy containing the catalyst to flow into diamond core 14. Alternate sweep paths of cobalt or other metal from the carbide annulus also are thereby reduced since available free areas within diamond core 14 already are filled by the low melting point alloy. Temperature windows for sintering processes using other second catalyst sources 16 in conjunction with various carbide structures can be similarly calculated for achieving controlled directional sweep or infiltration of the catalyst alloy through the central diamond core while not providing an opportunity for the catalyst or other metal from the carbide annulus to substantially infiltrate therein.

Some slight infiltration from the annulus is thought to occur as depicted at 17 in FIG. 2 when a cobalt/boron alloy as source 16 is used. It is assumed that the infiltrated boron from the second catalyst source makes itself available to the cobalt near the surface of annulus 12 enabling the cobalt to flow from the carbide as a eutectic. This, in turn, beneficially affects a bond between diamond core 14 and supporting carbide annulus 12. The lower sintering temperature additionally minimizes the risks to the apparatus used to achieve HP/HT sintering conditions resulting in a decrease in the costs of the process.

Without limitation, additional sweep alloy compositions which may find utility in accordance with the precepts of the present invention include, for example, nickel/boron, cobalt/palladium, cobalt/tantalum/boron, iron/nickel/boron, cobalt/boron (optionally with copper), cobalt/beryllium, cobalt/manganese, nickel/manganese, cobalt/tantalum/boron, cobalt/niobium/boron, cobalt/molbydenum/ boron, cobalt/boron/tungsten, and nickel/iron/chromium/phosphorous/boron/silicon.

It should be noted that the selection of a second catalyst source according to this invention must be based on the melting point of the catalysts in the context of the system in which they are present. Thus, the melting point of a cobalt catalyst in a cemented tungsten carbide will typically be less than the melting point of cobalt itself. Similarly, the melting point of a catalyst in a second catalyst source, such as cobalt in a cobalt/boron alloy, will be at a eutectic temperature below that for cobalt alone. As already noted, the temperature differential between the melting point of the catalyst in the second catalyst source and that in the cemented carbide mass should be at least 50° C., advantageously at least about 100° C., and preferably at least about 200° C.

As depicted in FIG. 2, sintering is accomplished directionally from second catalyst source 16 and completed at the oppositely disposed end of the assembly. The opposite end of the diamond core 14 may contain a flawed area, generally in the center. The shape and location of the flawed area suggests that the sweep front of catalyst from source 16 does not move as a uniform wave-front, but travels preferentially along the interior wall of carbide annulus 12. The flow path of catalyst from disc 16 along the annulus die wall then proceeds across metal enclosure 10 at the oppositely disposed end. Such flow path of catalyst up to and across the oppositely disposed end is thought to occur prior in time to the sweep up the core center and may lead to a soft, non-bonded inner core at the end. The finer the particle size of the diamond in core 14, the more likely is this phenomenon to occur.

Figure 3:
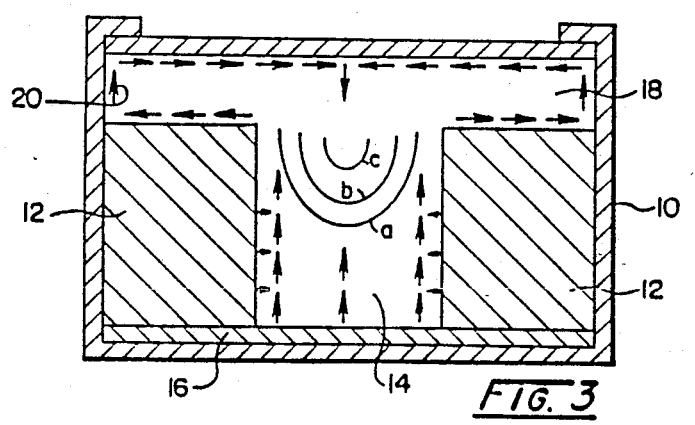
FIG. 3 is a cross-sectional view like that of FIG. 2, except that an additional upper layer of diamond material oppositely disposed from a catalyst disc is contained within the assembly.

As depicted in FIG. 3, upper layer 18 of material such as a diamond, or $B_4C$ powder advantageously may be used to increase the sweep path length as sweep path 20 in FIG. 3 shows. Increasing the sweep path length has the effect of displacing the flawed area from position a to position b to position c, etc. until a position is reached within material 18 which can be removed during finishing operations by conventional techniques such as lapping. Additionally, with smaller diamond particles, the greater resistance to flow and corresponding increase in path length assists in ensuring good quality diamond cores. The use of such a layer also serves to concentrate impurities pushed by the flow of catalyst outside of diamond core 14.

Preferred forms of high pressure/high temperature apparatus in which the diamond wire drawing compacts of the present invention may be prepared are known in the art, as typified by U.S. Pat. No. 2,941,248 which describes a "belt apparatus". Operational techniques for simultaneously applying both high pressure and high temperature in this type of apparatus also are well known to those skilled in the super pressure art. In practice, a number of assemblies as depicted in FIG. 3 normally are combined in a charge assembly and placed in a belt apparatus as described, for example, in U.S. Pat. No. 3,609,818. Thereafter, the pressure and then the temperature are increased and held at desired conditions for a time sufficient for diamond sintering to occur. It should be noted that a slower, step-wise heating sequence has been found to be desirable when practicing the present invention in order to ensure complete and uniform melting of the second catalyst source for diffusion through the diamond particles of the compacts being sintered. In this manner the temperature gradually can be increased to over the melt temperature of the metal in carbide support 12 to ensure a joining with diamond core 14 as noted above. Thereafter, the sample is allowed to cool under pressure for a short period of time followed by a gradual release of pressure to atmospheric pressure. The compact is recovered and the shield metal sleeve manually removed. Any adhering metal from the shield metal cup or disc can be ground or lapped off. Distortion or surface irregularity may be removed in a similar manner.

After removal of adhering materials from the compacts resulting from the process and finishing, the recovered wire die compacts comprise sintered polycrystalline diamond contained within and bound to a cemented metal carbide mass. Thereafter, formation of a wire drawing hole through the sintered mass of polycrystalline diamond may be accomplished by a laser or other conventional technique or may be preformed during the sintering, as is well known in this art.

The following examples show how the present invention can be practiced, but should not be construed as limiting.

EXAMPLES

EXAMPLE 1

A cobalt cemented tungsten carbide annulus with an inner diameter of 14 mm, outer diameter of 25 mm, and a height of 18 mm was placed into a refractory metal container (Ta, Zr, Nb as examples). 10.0 gm of less than 75 micron size diamond was loaded into the core of the carbide annulus and container. Approximately 2.5 gms of 10 mesh powdered cobalt with 4% boron was placed above the ring and diamond. The complete assembly was sealed with a refractory metal lid, loaded into a HP/HT apparatus, and heated to at least the melting point of the cobalt/4% boron and maintained at about 1100° C. in the apparatus at about 50 kB for 30 minutes. Examination of the exposed and polished diamond core revealed a well bonded and homogeneous structure at a magnification of 500 x.

To obtain wire drawing dies having fine grain sintered diamond, the central diamond core normally is formed from diamond particles having a grain size of less than about 10 microns and generally such particles range in size from about 2–4 microns or less. While it should be understood, however, that the process of the present invention permits use of such fine grain diamond particles which is a decided benefit in favor of the present invention, it also should be understood that the process beneficially can be used for larger grain size diamond particles as well. Thus, the process of the present invention retains the ability and flexibility to utilize larger grain diamond particles while permitting the reproduction of diamond wire drawing dies from very fine grain diamond particles. With very fine crystal size of diamond particles, e.g. 2–4 microns, reduction of impurity levels to less than 1 ppm even may be unacceptable. It is apparent to those skilled in this art that conventional diamond and assembly part preparation is an important factor in obtaining reproduceably good dies, especially for the fine particle size of diamond which may be used in the present invention.

EXAMPLE 2

Approximately 0.20 gm of a −10 mesh powder of 60% manganese and 40% nickel was placed on the bottom of a refractory metal container (Ta, Zr, Nb, as examples). A cobalt cemented tungsten carbide annulus with an inner diameter of 4.5 mm, an outer diameter of 8.7 mm, and a height of 4.8 mm was placed on top of the powder. The core of the annulus was charged with approximately 0.25 gm of less than 4 micron diamond. The container was sealed with a refractory metal lid, placed into a cell following the techniques of U.S. Pat. No. 3,831,428, and was heated to approximately 1150° C. at about 50 kB for about 15 minutes. Examination of the exposed diamond core revealed a homogeneous and well bonded structure at a magnification of 2000 x. Additional observations of the polished cross-section of the diamond core demonstrated that the core was free of any poorly bonded zones and that undesirable features such as grain growth were notably absent. Experience suggests that conventional configurations under similar conditions without the second catalyst source in which cobalt from the support annulus freely infiltrates radially into the diamond core typically would yield unacceptable cores.

EXAMPLE 3

A disc containing 74% cobalt, 4% boron, and 22% tantalum was placed on the bottom of a refractory metal container (Ta, Zr, Nb, as examples). An annulus of cobalt cemented tungsten carbide with an inner diameter of 4.5 mm, outer diameter of 14 mm, and a height of 6 mm was placed on top of the disc. The core of the carbide mass was loaded with 1.0 gm of less than 2 micron diamond. The container was sealed with a refractory metal lid and was placed into an HP/HT apparatus. The assembly was heated to approximately 1250° C. at a pressure of about 55 kB. The heating duration was about 20 minutes. The exposed diamond core was visually examined after sintering using optical and scanning election microscopy. Diamond-to-diamond bonding was excellent and the microstructure homogeneous. The diamond core uniformity was confirmed using transmission x-radiographic techniques.

Figure 4:
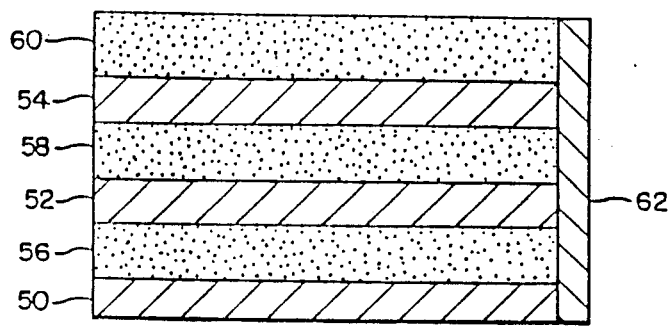
FIG. 4 is a cross-sectional view through a sandwich arrangement of carbide-supported diamond for making carbide-supported polycrystalline diamond compacts, which sandwich arrangement has a second source of catalyst adjacent thereto.

While the foregoing examples all have described configurations adapted for the production of a polycrystalline diamond wire die compact, the present invention also is applicable to other polycrystalline diamond configurations. For example, it could be used in a configuration such as described in U.S. Pat. No. 4,219,339, in which a polycrystalline diamond layer is sandwiched between two support layers of a cemented metal carbide. In such a configuration, the provision of a second catalyst source according to the present invention adjacent an edge of the polycrystalline diamond not covered by the carbide supports should provide a directional flow of catalyst during HP/HT processing parallel to the carbide support layers. More particularly, FIG. 4 shows such a sandwich configuration wherein carbide supports 50, 52, and 54 support diamond layers 56, 58, and 60, respectively. The container and remaining structure of the HP/HT apparatus are not shown in FIG. 4, but are to be provided in conventional fashion. Second catalyst source 62 is placed adjacent the sandwich carbide/diamond layers such that exposed edges of diamond layers 56, 58, and 60 are adjacent such second catalyst source. Second catalyst source 62, being essentially perpendicular to the carbide support and diamond layers, should provide a directional flow of catalyst during HP/HT processing parallel to the carbide support layers and through the diamond layers. The following is an example using another configuration.

EXAMPLE 4

Figure 5:
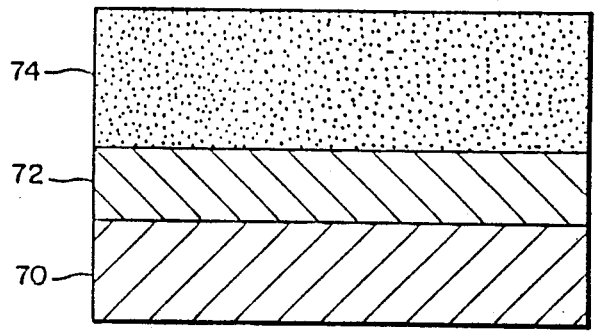
FIG. 5 is a cross-sectional view of a carbide-supported polycrystalline diamond compact having a layer of a second source of catalyst interposed between the layer of diamond and the mass of support carbide.

A refractory metal container (Zr, Ta, Nb, as examples) was charged with 0.6 gm of a 20% of −2 micron and 80% of 800 to 1000 micron diamond feed. A 0.5 mm thick disc of cobalt with 3% boron was placed directly above the diamond. A cobalt cemented tungsten carbide disc with a diameter of 14 mm and a thickness of 3 mm was inserted on top of the Co/B disc and the container was sealed with a refractory metal lid. Such a configuration is depicted in FIG. 5 wherein diamond layer 74 and carbide support 70 has second catalyst source 72 interposed therebetween. After placing the container into a high pressure cell, the sample was heated to about 1150° C. for 10 minutes at approximately 55 kB. The exposed diamond surface of the received product was examined and found to be uniform and well-sintered with an excellent degree of diamond-to-diamond bonding. Performance tests using turning experiments on hard cobalt cemented tungsten carbide (6% cobalt) with this tool demonstrated that its cutting abilities were good and that sintering was complete. Under the HP/HT conditions used to manufacture this tool, cobalt extraction from a support carbide using a conventional technique would not be possible.

As used herein, the term "adjacent" is intended to describe a configuration in which a cemented metal carbide or second catalyst source is positioned in an assembly sufficient to enable a flow of catalyst material therefrom into a mass of diamond particles. Thus, for example, a second catalyst source may be placed in direct contact with a mass of diamond particles. Similarly, a cemented metal carbide layer would be considered adjacent to a mass of diamond particles if an intervening layer of tantalum, titanium, etc. as descibed in U.S. Pat. No. 4,108,614, which intervening layer is pervious to a flow of cobalt from the carbide, were placed between the carbide and the diamond mass.

In this application, all percentages and proportions are by weight and all units are in the metric system, unless otherwise expressly indicated. Additionally, all references cited herein are expressly incorporated herein by reference.

We claim:

1. A composite compact comprising a diamond recrystallization catalyst-containing sintered metal carbide support bonded to a polycrystalline diamond compact characterized by diamond-to-diamond bonding resulting from a high pressure/high temperature process wherein a second source of catalyst for diamond recrystallization is selectively diffused through a mass of diamond particles forming said polycrystalline diamond compact, which polycrystalline diamond compact contains catalyst from said second source and substantially no metal catalyst from said carbide support, said catalyst from said second source having a melting point under said high pressure/high temperature conditions which is lower than the melting point of said catalyst in said metal carbide support.

2. The composite compact of claim 1, wherein both catalysts are selected from the group consisting of cobalt, iron, nickel, ruthenium, rhodium, osmium, palladium, iridium, platinum, chromium, manganese, tantalum and mixtures thereof.

3. The composite compact of claim 1, wherein said second catalyst comprises a combination of said catalyst and a diffusion aid.

4. The composite compact of claim 3, wherein said diffusion aid comprises boron.

5. The composite compacta of claim 1, wherein said diamond particles in said mass of diamond particles are not more than about 10 microns in size.

6. A wire die compact comprising a diamond recrystallization catalyst-containing sintered metal carbide annulus and a polycrystalline diamond compact disposed therein which compact is characterized by diamond-to-diamond bonding resulting from a high pressure/high temperature process wherein a second source of catalyst for diamond recrystallization is selectively diffused through a mass of diamond particles disposed within said annulus for forming said polycrystalline diamond wire die compact, which polycrystalline diamond compact contains catalyst from said second source and substantially no metal catalyst from said metal carbide annulus, said catalyst from said second source having a melting point under said high pressure/high temperature conditions which is lower than the melting point of said catalyst in said metal carbide annulus.

7. The wire die compact of claim 6, wherein both catalysts are selected from the group consisting of cobalt, iron, nickel, ruthenium, rhodium, osmium, palladium, iridium, platinum, chromium, manganese, tantalum and mixtures thereof.

8. The wire die compact of claim 6, wherein said second catalyst comprises a combination of said catalyst and a diffusion aid.

9. The wire die compact of claim 8, wherein said diffusion aid comprises boron.

10. The wire die compact of claim 1, wherein said diamond particles in said mass of diamond particles are not more than about 10 microns in size.

* * * * *